United States Patent [19]
Miller et al.

[11] Patent Number: 6,025,006
[45] Date of Patent: Feb. 15, 2000

[54] FOAM INDUCING COMPOSITIONS AND METHOD FOR MANUFACTURE THEREOF

[75] Inventors: Miranda Miller, Arlington Heights; Kevin J. Surber, Hoffman Estates; Daniel G. Lis, Schaumburg, all of Ill.; Robert W. Martin, Jr., San Ramon, Calif.; Gerard L. Hasenhuettl, Deerfield, Ill.

[73] Assignee: Kraft Foods, Inc., Northfield, Ill.

[21] Appl. No.: 08/928,597

[22] Filed: Sep. 12, 1997

Related U.S. Application Data

[63] Continuation-in-part of application No. 08/609,458, Mar. 1, 1996, abandoned.

[51] Int. Cl.[7] ................................................ A23L 1/035
[52] U.S. Cl. ..................... 426/564; 426/570; 426/573; 426/601; 426/602; 252/310
[58] Field of Search .................................. 426/531, 601, 426/602, 603, 608, 611, 804, 564, 565, 566, 570, 572, 573; 252/310

[56] References Cited

U.S. PATENT DOCUMENTS

| | | | |
|---|---|---|---|
| 3,924,018 | 12/1975 | Sims | 426/564 |
| 3,928,648 | 12/1975 | Stahl | 426/564 |
| 4,242,364 | 12/1980 | Buddermeyer | 426/613 |
| 5,626,903 | 5/1997 | Gautchier | 426/572 |
| 5,658,609 | 8/1997 | Abboud | 426/609 |
| 5,736,177 | 4/1998 | McGinley | 426/604 |

FOREIGN PATENT DOCUMENTS

| | | |
|---|---|---|
| 521543 | 2/1992 | European Pat. Off. . |
| 547647 | 5/1992 | European Pat. Off. . |
| 513187 | 10/1996 | European Pat. Off. . |
| WO 94/12063 | 6/1994 | WIPO . |

*Primary Examiner*—Carolyn Paden
*Attorney, Agent, or Firm*—Fitch, Even, Tabin & Flannery

[57] ABSTRACT

A full fat and foam inducing composition for use in reduced fat food products is provided. The composition is an aqueous gel matrix of ester vesicles which is provided by a mixture of diacetyl tartaric acid mono fatty acid glyceride ester and a second ester having a hydrophilic-lipophilic balance of above about 10 and a melting point above about 100° F.

36 Claims, 1 Drawing Sheet

12%  780x

FOAM INDUCING COMPOSITIONS AND METHOD FOR MANUFACTURE THEREOF

CROSS-REFERENCE TO RELATED APPLICATION

This application is a continuation-in-part of application Ser. No. 609,458 filed Mar. 1, 1996 now abandoned.

FIELD OF THE INVENTION

The present invention relates generally to aerated food products. More particularly, the present invention relates to a foam inducing composition which is an aqueous matrix of ester vesicles for use in reduced fat and full fat food products.

BACKGROUND OF THE INVENTION

Many types of aerated food products are known in the marketplace. Such products include ice cream, cream cheese, butter, margarine, yogurt, salad dressings, sauces, puddings, gelatin desserts, process cheese spreads dips and peanut butter. The amount of aeration in the food product is characterized by the term "overrun". Overrun is the relationship of the volume of the aerated food product to that of the unaerated food product. Overrun is calculated by the following formula:

$$\text{Overrun} = \frac{\text{Aerated Volume} - \text{Initial Volume}}{\text{Initial Volume}} \times 100$$

Thus, an overrun of 100 means that the volume of the aerated food product is twice as much as the volume of the unaerated food product.

It is difficult to provide stable food products that have an overrun above 200. Such high overrun aerated food products tend to collapse and undergo syneresis. High overrun food products also tend to be difficult to freeze without undergoing product degradation.

The present invention is directed to providing an aqueous matrix of ester vesicles which can be used to induce an aerated or foam structure in fluid food products, wherein the aerated food product is very stable even when high overruns of 200 to 1200 are imparted.

It is a principal object of the present invention to provide a composition which can be used in food products to provide an aerated texture.

It is a further object of the present invention to provide aerated food products with high overrun which are stable and do not undergo syneresis after extended storage periods.

SUMMARY OF THE INVENTION

A foam inducing composition for use in full fat and reduced fat food products is provided. The composition is an aqueous gel matrix of ester vesicles which is provided by a mixture of a first ester which is diacetyl tartaric acid mono fatty acid glyceride ester and a second ester having a hydrophilic/lipophilic balance (HLB) above about 10 and a melting point above about 100° F. The second ester can be selected from the group consisting of mono-, di- and tri-fatty acid esters of sucrose polyglycerol fatty acid esters, polyglycerol fatty acid esters, decaglycerol monostearate and sodium stearoyl lactylate.

DETAILED DESCRIPTION OF THE INVENTION

Figure 1:
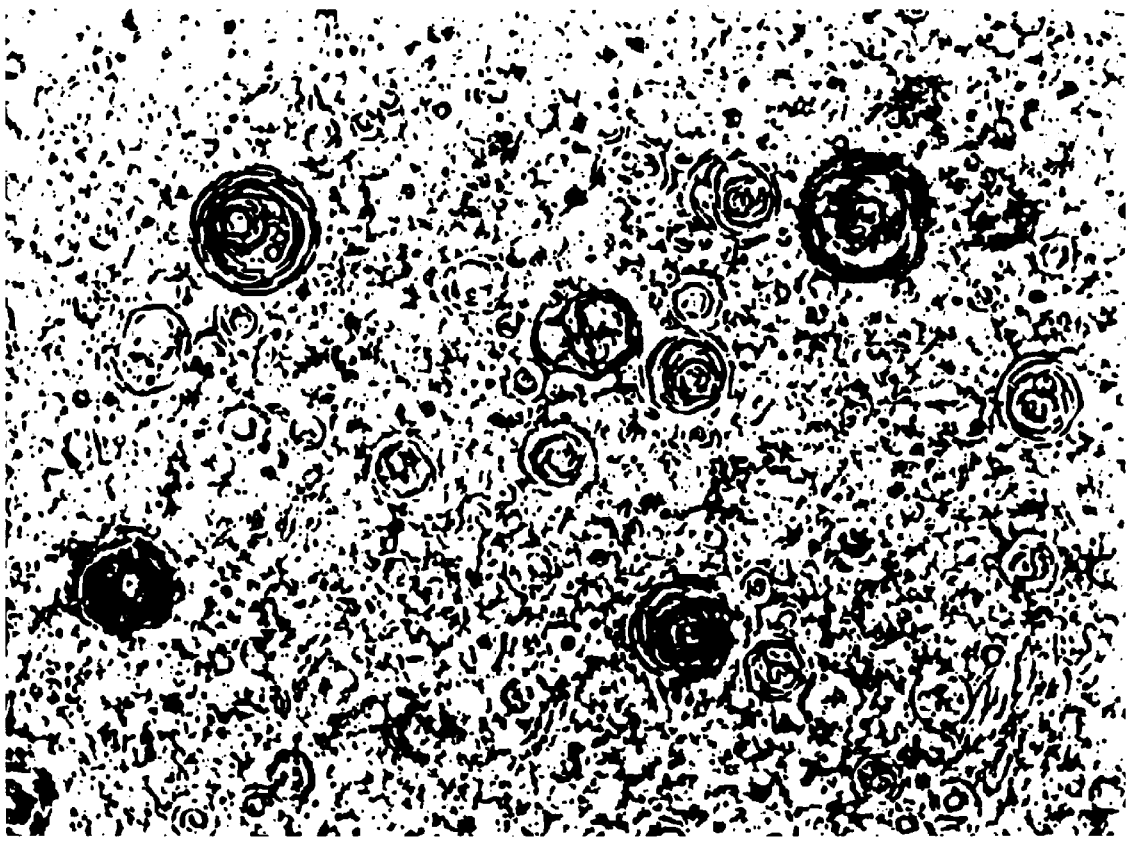
FIG. 1 is a photomicrograph of the aqueous gel matrix of ester vesicles of the present invention having a 12% level of a 50/50 mixture of diacetyl tartaric acid monostearate glyceride and sucrose monostearate taken at 780×.

Generally, the present invention is directed to an aqueous composition which imparts an aerated foam structure to full fat and reduced fat food products. Such food products include pourable dressings, mayonnaise type dressings, frozen desserts, whipped topping, cheese and other dairy products. The reduced fat food products can have from 0 to about 20% of fat. The composition is an aqueous gel matrix of ester vesicles. The ester vesicles are provided by a mixture of a first ester which is diacetyl tartaric acid mono fatty acid glyceride ester and a second ester having an HLB above about 10 and a melting point above about 100° F. In an important embodiment of the invention, the second ester is selected from the group consisting of mono-, di- and tri-fatty acid esters of sucrose, polyglycerol fatty acid esters, decaglycerol monostearate and sodium stearoyl lactylate. The preferred sucrose fatty acid is sucrose mono-fatty acid ester.

For technological purposes, it is useful to be able to classify emulsifiers according to their stabilizing efficiency for a particular type of emulsion. A well established empirical procedure for doing this is the hydrophile-lipophile balance (HLB) method of W. C. Griffin, *J. Soc. Cosmetic Chem.*, 1, 311 (1949). It is based upon the idea that for a given oil and water system, there is an optimum balance between molecular hydrophilic and lipophilic character which leads to maximum emulsification efficiency. Emulsifiers with low HLB numbers (i.e., in the range of 4–6) are suitable for preparing water-in-oil emulsions, while those with high HLB numbers (i.e., in the range of 9–18) are suitable for oil-in-water emulsions. Emulsifiers with intermediate or medium HLB numbers (6–9) are suitable for either type of emulsion depending upon ratio of oil and water, temperature and other conditions.

HLB numbers may be determined experimentally by the method originally described by Griffin, or empirically using the formula of J. T. Davies, *Proc. 2nd Int. Cong. Surface Activity*, Vol. 1, p. 426 (1957):

$$HLB = 7 + \sum_i \frac{1}{i} n_H(i) - \sum_j \frac{1}{j} n_L(j)$$

in the above equation, $n_H(i)$ and $n_L(j)$ are empirically-derived individual group numbers for the hydrophilic groups (i) and lipophilic groups (j) assigned by Davies.

Using the empirical method, HLB values for specific emulsifiers useful in this invention are as follows: Diacetyl tartaric acid monostearate glyceride, HLB 8; sucrose monostearate, HLB 16; decaglycerol monostearate, HLB 13; sodium stearoyl lactylate, HLB 21. It should be noted that group numbers for charged residues depend on the ionic strength of the aqueous phase. Therefore, although the calculated HLB value for sodium stearoyl lactylate is 21, an experimentally derived HLB value would be closer to 12. The sucrose esters are mixtures of molecules with various degrees of esterification. Although the monoesters have HLB values of 16 or more, as more esters are added the molecules become more lipophilic and the HLB value decreases. A wide range of HLB values can be obtained from HLB 0 to HLB 18 depending on the number and chain length of the esters. The sucrose esters most preferred for this invention are those with HLB values greater than 10.

Key considerations for the fatty acid ester substituent of the emulsifier components are melting point and crystallization. Typical cis unsaturated fatty acids have very low melting points and would therefore be unsuitable for this invention. Furthermore, if cis unsaturated fatty acids with very low melting points occur in a mixture, they would disrupt the crystal packing and destroy the lamellar nature of the complexes needed for this invention to work. On the other hand, trans unsaturated fatty acids may work very well. They have high melting points and crystallize.

The preparation of sucrose fatty acid esters useful in the present invention is described in U.S. Pat. No. 5,565,557. The preparation of polyglycerol fatty acid esters useful in the present invention is described in U.S. Pat. No. 3,637,774.

The fatty acid of the diacetyl tartaric acid mono fatty acid glyceride ester is selected from the group consisting of saturated and unsaturated $C_6$–$C_{22}$ fatty acids. Preferred saturated fatty acids are stearic acid and palmitic acid. Preferred unsaturated fatty acids are long chain ($C_{16}$–$C_{22}$) trans unsaturated fatty acids. The fatty acid of the sucrose fatty acid and polyglycerol fatty acid esters is also selected from the group consisting of saturated and unsaturated $C_6$–$C_{22}$ fatty acids. The preferred saturated fatty acids for the sucrose fatty acid esters and polyglycerol fatty acid esters are stearic acid and palmitic acid. Preferred unsaturated fatty acids are long chain ($C_{16}$–$C_{22}$) trans unsaturated fatty acids. Key considerations in selection of fatty acids are the melting point and crystallization of the fatty acid esters. The preferred fatty acids all result in esters which have melting points above 100° F. and which easily crystallize upon cooling to temperatures below their melting point. The most preferred fatty acids for all esters are long chain ($C_{16}$–$C_{22}$) saturated fatty acids.

The mixture of esters to provide the ester vesicles contains diacetyl tartaric acid mono fatty acid glyceride ester at a level of from about 25% to about 75% by weight. All percentages used herein are by weight unless otherwise indicated. The second ester is also present at a level of from about 25% to about 75% by weight. The preferred mixture contains from about 60% to about 40% of each of the first ester and second ester.

To prepare the aqueous compositions of the invention, it is important to provide a well blended homogeneous mixture of the dry powdered esters prior to dispersing the esters in water in a kettle. If necessary, when the ester is not a dry powder at ambient temperature, the ester may be frozen and ground to a powder while frozen. If the first and second esters are added individually to the water, the mixture does not form an aqueous gel. The mixture of esters are present in the water at a level of from about 2% to about 20%. The dispersion is stirred with a suitable mixer, such as a propeller mixer, as it is heated to a temperature of from about 180° F. to about 200° F. over a period of from about 10 minutes to about 30 minutes. The heated dispersion is then cooled to about 130° F. to about 150° F. within 30 minutes while continuing stirring. The mixture can then be permitted to cool to ambient temperature without stirring. For very small batches of less than about 1000 grams, stirring can be discontinued as soon as it reaches the desired elevated temperature. At the elevated temperature, the composition is a white milky fluid which gels upon cooling. The mixture of esters forms a complex in the form of multilamellar vesicles upon cooling to refrigeration temperatures. The ester vesicles are dispersed as a matrix in the aqueous medium. Under microscopic examination, the vesicles resemble the structure of an onion which appears to have alternating hydrophobic and hydrophilic layers with water trapped between the layers. FIG. 1 clearly shows the structure and shape of the vesicles. The vesicles range in size from about 1 micron to about 20 microns.

The aqueous ester gel can also be used to prepare very stable foams having a high overrun of from about 200 to about 1200. The foams are stable enough to be frozen and thawed without undergoing syneresis. The foams can be used as is or can be combined with other food products to provide an aerated food product. Suitable food products for combining with the foams include yogurt, whipped topping base, ice cream base, cream cheese, tablespreads, gelatin desserts, puddings, peanut butter, salad dressings, process cheese spreads or any suitable fluid or gel type food product where an aerated texture is desired.

The foams are prepared by diluting the aqueous gel, if necessary, with additional water to provide a foam base having from about 1% to about 5% ester mixture. The foam base is then whipped with a suitable mixer, such as a Hobart™ food mixer provided with a wire whip, until the desired level of overrun is obtained. When very low levels of the ester mixture, i.e., from about 1% to about 3%, are present in the foam base, it is desirable to provide a bulking agent in the foam base. The bulking agent may be any of the commonly used food bulking agents, such as maltodextrins having a DE of from about 1 to about 20 and corn syrup solids having a DE of from about 20 to about 60. The bulking agent, if used is present in the foam base at levels of from about 20% to about 40%.

The following examples further illustrate the compositions of the present invention, but are intended to in no way limit the scope of the invention as set forth in the appended claims

EXAMPLE 1

An aqueous ester vesicle composition was prepared. Equal parts of diacetyl tartaric acid monostearate and sucrose monostearate were homogeneously blended. The total amount of diacetyl tartaric acid monostearate glyceride used was 3%, the total amount of sucrose monostearate was 3% and the amount of water was 94%.

The aqueous ester vesicle compositions were prepared by ading the blended esters and water into a kettle and heating the ingredients with vigorous stirring to a temperature of 190° F. over a period of 20 minutes to provide a white milky fluid which gelled on cooling to refrigeration temperatures to provide ester vesicles.

The ability of the ester vesicles of the present invention to incorporate air into products was demonstrated by making a fat free frozen whipped topping. The following formula was prepared:

| Ingredient | Weight % |
| --- | --- |
| Water | 33.3 |
| Aqueous matrix* | 33.3 |
| Corn syrup (DE 24) | 17.25 |
| High fructose corn syrup | 5.5 |
| Sugar | 5.35 |
| Inulin | 3.1 |
| Dairy Lo | 2.0 |
| Xanthan gum | 0.2 |
| Vanilla flavor | to taste |

*the aqueous ester matrix contained 3% diacetyl tartaric acid monostearate glyceride, 3% sucrose monostearate and 94% water.

To prepare the frozen foamed whipped topping, the water and the aqueous matrix were placed in the bowl of a Hobart™ mixer. The inulin was sifted in and hydrated as the mixer was operated. The xanthan gum, sugar, dairy-lo were dry blended and then sifted into the mixture. The syrups were added along with the vanilla. Whipping continued with the Hobart™ mixer on maximum speed. Part of the product needed to be removed from the bowl of the Hobart mixer to make room for foam. The result was to provide 10 cool whip tubs of product at approximately 700% overrun.

of the esters in the mixture. The mixtures were placed in a bowl of a Hobart™ mixer equipped with a wire whisk. The mixtures were mixed for 1 minute on the lowest speed, followed by 3 minutes on the highest speed. Overrun was measured as the percent volume of air per weight of mixture. Compositions and overruns are shown in the table below.

| Ingredients | HLB | m.p. (° F.) | Var 1 (%) | Var 2 (%) | Var 3 (%) | Var 4 (%) | Var 5 (%) | Var 6 (%) | Var 7 (%) |
|---|---|---|---|---|---|---|---|---|---|
| Diacetyl tartaric acid monostearate glyceride | 8 | 140 | 3.0 | 4.0 | 3.0 | — | 3.0 | — | — |
| Sucrose monostearate | 16 | 133 | 3.0 | — | — | 3.0 | — | — | 3.0 |
| Decaglycerol monostearate | 13 | 126 | — | 2.0 | — | — | — | — | — |
| Sodium stearoyl lactylate | ~12 | 113 | — | — | 3.0 | — | — | 3.0 | 3.0 |
| Glycerol monostearate | 4 | 162 | — | — | — | 3.0 | — | — | — |
| Polyoxyethylene sorbitan monostearate | 15 | 86 | — | — | — | — | 3.0 | — | — |
| Sucrose stearate[1] | 9 | 113 | — | — | — | — | — | 3.0 | — |
| Water | — | — | 94.0 | 94.0 | 94.0 | 94.0 | 94.0 | 94.0 | 94.0 |
| Overrun of mixture (%) | — | — | 1020 | 1050 | 1200 | 1030 | 536 | none | none |

[1]Ryoto 5970

EXAMPLE 2

The present example demonstrates the ability of the aqueous gel of the present invention to provide a stable foam. An aqueous gel matrix containing 3% of diacetyl tartaric acid monostearate glyceride and 3% of sucrose monostearate was prepared in accordance with the procedure of Example 1.

200 grams of the aqueous gel and 200 grams of water were placed in the bowl of a Hobart™ mixer equipped with a wire whip. After 5 minutes of whipping at the highest speed, a foam having an overrun of 700 was obtained. The foam was extremely stable and could be frozen and thawed without undergoing syneresis. When the individual esters without being formed into an aqueous gel matrix were added to water at the same level (3% total ester), a foam could not be attained.

EXAMPLE 3

Various aqueous compositions of esters were prepared in accordance with the procedure in Example 1 wherein the total amount of emulsifier was 6%. With the exceptions noted below, emulsifiers were thoroughly mixed by dry-blending prior to introduction into aqueous medium. For Variant 2, which contained decaglycerol monostearate, cryo-grinding with dry ice was required to uniformly blend the emulsifiers. For Variant 5, the polyoxyethylene sorbitan monostearate component was melted at 90° F. prior to mixing the two emulsifiers. After forming the vesicles or complexes, the emulsifier compositions were cooled at 45° F. for at least 16 hours.

To make foams, 100 g of each of the variants was mixed with 100 g of water and 100 g of sucrose, thus providing 3%

Variants 1, 2 and 3 aerated very rapidly. After 1 minute of whipping, they had achieved almost maximum air incorporation. The resulting foams from variants 1, 2 and 3 appeared dry and were stable after several weeks in the refrigerator with no drainage.

Variants 4 and 5 were much slower to aerate, incorporating very little air until after 2 minutes of whipping. Foams from Variants 4 and 5 were soft and wet. Microscopically, the air cells of foams from variants 4 and 5 were much larger than those from variants 1, 2 and 3. Although the overrun of foam from variant 4 was similar to those from variants 1, 2 and 3, it was a weaker foam. After several days, the foam made with variant 4 became very open in texture. After 1 week of storage, the foam showed considerable drainage and collapse. The foam made with variant 5 was even weaker than that made with variant 4, showing drainage and collapse after only 1 day of storage.

Variants 6 and 7 did not incorporate any air even after prolonged whipping at high speed.

This example illustrates the unique benefits of compositions containing diacetyl tartaric acid monostearate glyceride and a high HLB emulsifier with m.p.>100° F. (variants 1, 2 and 3). Although foams could be formed with variant 4 (a low HLB emulsifier and a high HLB emulsifier with m.p.>100° F.) and variant 5 (diacetyl tartaric acid monostearate glyceride and a high HLB emulsifier with m.p.<100° F.), both were weak foams. Complexes of two high or medium HLB emulsifiers which did not contain diacetyl tartaric acid monostearate glyceride (variants 6 and 7) were not able to incorporate air.

What is claimed is:

1. A composition which is useful to provide a stable aerated foam, said composition comprising an aqueous gel matrix containing a dispersion of ester vesicles in water, wherein said ester vesicles are prepared from a homogeneous mixture of powdered esters that are dispersed in water and formed into an aqueous gel mixture of a first ester which is diacetyl tartaric acid esters of mono fatty acid (glyceride and a second ester having an HLB above about 10 and a melting point above about 100° F., wherein said second ester is selected from the group consisting of mono-, di- and tri-fatty acid esters of sucrose, polyglycerol fatty acid esters, decaglycerol monostearate and sodium stearoyl lactylate, and wherein the fatty acid component of each of said first and said second esters is selected from the group consisting of $C_6$–$C_{22}$ saturated and unsaturated fatty acids.

2. A composition in accordance with claim 1 wherein the fatty acid component of each of said first and said second esters is selected from $C_6$–$C_{22}$ saturated fatty acids.

3. A composition in accordance with claim 1 wherein the fatty acid component of each of said first and said second esters is selected from the group consisting of palmitic and stearic acids.

4. A composition in accordance with claim 1 wherein the fatty acid component of each of said first and said second esters is selected from $C_{12}$–$C_{22}$ trans unsaturated fatty acids.

5. A composition in accordance with claim 1 wherein each of said first and said second esters is present in the mixture at a level of from about 25% to about 75% by weight.

6. A composition in accordance with claim 1 wherein the aqueous gel matrix contains from about 80% to about 98% of water and from about 2% to about 20% of the ester mixture.

7. A composition in accordance with claim 1 wherein said second ester is a sucrose mono-fatty acid ester.

8. A composition in accordance with claim 1 wherein said second ester is a polyglycerol fatty acid ester.

9. A composition in accordance with claim 1 wherein said second ester is decaglycerol monostearate.

10. A composition in accordance with claim 1 wherein said second ester is sodium stearoyl lactylate.

11. A food product containing the composition of claim 1 wherein said composition is present at a level sufficient to provide the ester mixture at a level of from about 0.1% to about 3%.

12. A method for making an aqueous gel matrix composition comprising
  (a) providing a well blended homogeneous mixture of dry powdered esters of a first ester, which is diacetylated tartaric acid mono fatty acid glyceride ester, and a second ester having an HLB above about 10 and a melting point above 100° F. and selected from the group consisting of sucrose fatty acid ester and polyglycerol fatty acid esters;
  (b) adding the homogeneous ester mixture to water to provide a dispersion;
  (c) heating said dispersion with mixing; and
  (d) cooling said dispersion to provide an aqueous gelled matrix containing dispersed ester vesicles provided by said ester mixture,
  wherein said second ester is selected from the group consisting of mono-, di- and tri-fatty acid esters of sucrose, polyglycerol fatty acid esters, decaglycerol monostearate and sodium stearoyl lactylate, and wherein the fatty acid component of each of said first and second esters is selected from the group consisting of saturated and unsaturated fatty acids having a carbon chain length of $C_6$–$C_{22}$.

13. A method in accordance with claim 12 wherein the fatty acid component of each of said first and said second esters is selected from the group consisting of $C_6$–$C_{22}$ saturated fatty acids.

14. A method in accordance with claim 12 wherein the fatty acid component of each of said first and said second esters is selected from the group consisting of palmitic and stearic acids.

15. A method in accordance with claim 12 wherein the fatty acid component each of said first and said second esters is selected from the group consisting of $C_{12}$–$C_{22}$ trans unsaturated fatty acids.

16. A method in accordance with claim 12 wherein each of said first and said second esters is present in the homogeneous mixture at a level of from about 25% to about 75% by weight.

17. A method in accordance with claim 12 wherein the aqueous gel matrix contains from about 80% to about 98% of water and from about 2% to about 20% of the ester mixture.

18. A method in accordance with claim 12 wherein said second-ester is a sucrose mono-fatty acid ester.

19. A method in accordance with claim 12 wherein said second ester is a polyglycerol fatty acid ester.

20. A method in accordance with claim 12 wherein said second ester is decaglycerol monostearate.

21. A method in accordance with claim 12 wherein said second ester is sodium stearoyl lactylate.

22. A method in accordance with claim 12 wherein said heating is to a temperature of from about 180° F. to about 200° F. over a period of from about 10 minutes to about 30 minutes.

23. A method in accordance with claim 12 wherein said dispersion is cooled to a temperature of from about 130° F. to about 150° F. within about 30 minutes while stirring is continued.

24. A method in accordance with claim 12 wherein said second ester is sucrose fatty acid ester which is selected from the group consisting of mono-, di- and tri-fatty acid esters.

25. A method in accordance with claim 12 wherein said ester mixture is added to said water at a level of from about 2% to about 20%.

26. A method in accordance with claim 12 wherein each of said first and said second esters is present in said homogeneous mixture at a level of from about 25% to about 75%.

27. A method for preparing a stable, aerated foam comprising the steps of preparing an aqueous gel matrix, by the method of claim 12, diluting said aqueous gel matrix with water to provide a foam base having from about 0.4% to about 5% of the ester mixture and whipping said foam base to provide a stable foam.

28. A method in accordance with claim 27 wherein the fatty acid component of each of said first and said second esters is selected from the group consisting of $C_{12}$–$C_{22}$ saturated fatty acids.

29. A method in accordance with claim 27 wherein the fatty acid component of each of said first and said second esters is selected from the group consisting of palmitic and stearic acids.

30. A method in accordance with claim 27 wherein the fatty acid component of each of said first and said second esters is selected from the group consisting of $C_{12}$–$C_{22}$ trans unsaturated fatty acids.

31. A method in accordance with claim 27 wherein the second ester is a sucrose fatty acid ester which is selected from the group consisting of mono-, di- and tri-fatty acid esters.

32. A method in accordance with claim 31 wherein said sucrose fatty acid ester is a sucrose mono fatty acid ester.

33. A method in accordance with claim 27 wherein the second ester is polyglycerol fatty acid ester which is polyglycerol mono fatty acid ester.

34. A method in accordance with claim 27 wherein the second ester is a lactylate ester salt which is sodium stearoyl lactylate.

35. A method in accordance with claim 27 wherein said ester mixture is present in said gel matrix at a level of from about 2% to about 20%.

36. A method in accordance with claim 27 wherein each of said first and said second esters is present in said homogeneous mixture of esters at a level of from about 25% to about 75%.

* * * * *

UNITED STATES PATENT AND TRADEMARK OFFICE
CERTIFICATE OF CORRECTION

PATENT NO. : 6,025,006
DATED : February 15, 2000
INVENTOR(S) : Miller et al.

It is certified that error appears in the above-identified patent and that said Letters Patent is hereby corrected as shown below:

Column 7,
Line 14, after "selected from" insert -- the group consisting of --.
Line 21, after "selected from" insert -- the group consisting of --.

Signed and Sealed this

Twenty-fourth Day of September, 2002

Attest:

JAMES E. ROGAN
Attesting Officer    Director of the United States Patent and Trademark Office